(12) United States Patent
Weber et al.

(10) Patent No.: US 12,319,196 B2
(45) Date of Patent: Jun. 3, 2025

(54) IMAGE PROJECTOR

(71) Applicant: NISSAN NORTH AMERICA, INC., Franklin, TN (US)

(72) Inventors: William Weber, Brighton, MI (US); Dale Butterworth, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 240 days.

(21) Appl. No.: 18/069,207

(22) Filed: Dec. 20, 2022

(65) Prior Publication Data
US 2024/0198895 A1 Jun. 20, 2024

(51) Int. Cl.
*B60Q 1/24* (2006.01)
*B60Q 1/32* (2006.01)
*F21V 21/14* (2006.01)
*G03B 21/14* (2006.01)

(52) U.S. Cl.
CPC ........... *B60Q 1/247* (2022.05); *G03B 21/145* (2013.01); *B60Q 1/32* (2013.01); *B60Q 2400/40* (2013.01); *B60Q 2400/50* (2013.01); *F21V 21/14* (2013.01)

(58) Field of Classification Search
CPC ...... B60Q 1/247; B60Q 1/32; B60Q 2400/40; B60Q 2400/50; G03B 21/145; F21V 21/14
USPC ............................................ 362/523; 353/13
See application file for complete search history.

(56) References Cited

U.S. PATENT DOCUMENTS

| | | | | |
|---|---|---|---|---|
| 1,395,039 | A * | 10/1921 | Chmurski | B60Q 1/50 362/520 |
| 6,422,728 | B1 * | 7/2002 | Riggin | B60Q 1/247 362/540 |
| 11,117,510 | B2 | 2/2021 | Weber | |
| 12,000,593 | B1 * | 6/2024 | Cantelar | F24C 1/16 |
| 2014/0313756 | A1 * | 10/2014 | Thomson | B60Q 1/32 362/512 |
| 2017/0050558 | A1 * | 2/2017 | Salter | H05B 47/115 |
| 2022/0348134 | A1 * | 11/2022 | Beernaert | B60Q 1/26 |

OTHER PUBLICATIONS

U.S. Appl. No. 17/958,220; Vehicle Light Assembly; W Weber, filed Sep. 30, 2022.

* cited by examiner

Primary Examiner — Laura K Tso
(74) Attorney, Agent, or Firm — Global IP Counselors, LLP (57) ABSTRACT

A vehicle comprises an image projector assembled to an underbody of the vehicle. The image projector has a bracket, a housing and an image emitter. The bracket is fixed to the underbody. The bracket has a plurality of first indentations. The housing has a plurality of second indentations that mate with the first indentations. The housing is adjustably disposed with respect to the bracket along the first and second indentations. The image emitter is provided in the housing and at least partially extends from the housing. The angle between the image emitter and the bracket changes as the housing is adjusted with respect to the bracket.

18 Claims, 6 Drawing Sheets

IMAGE PROJECTOR

BACKGROUND

Technical Field

The present disclosure generally relates to an image projector. More specifically, the present disclosure relates to an image projector that can be mounted to a vehicle body.

Background Information

Vehicles can be equipped with welcome lights that include interior and exterior lights of a vehicle. For example, interior map lights are welcome lights that illuminate upon the vehicle has been unlocked or about to be unlocked. Additionally, vehicles can include exterior lights that illuminate when the vehicle is unlocked or about to be unlocked. Exterior lights can illuminate external areas that are in the vicinity of the vehicle. Exterior lights can include image projectors that project images such as the vehicle's logo or emblem.

SUMMARY

In view of the state of the known technology, one aspect of the present disclosure is to provide a vehicle comprising of an image projector assembled to an underbody of the vehicle. The image projector has a bracket, a housing and an image emitter. The bracket is fixed to the underbody. The bracket has a plurality of first indentations. The housing has a plurality of second indentations that mate with the first indentations. The housing is adjustably disposed with respect to the bracket along the first and second indentations. The image emitter is provided in the housing and at least partially extends from the housing. The angle between the image emitter and the bracket changes as the housing is adjusted with respect to the bracket.

In view of the state of the known technology, another aspect of the present disclosure is to provide an image projector assembled to an underbody of the vehicle. The image projector has a bracket, a housing and an image emitter. The bracket is configured to be fixed to the underbody of the vehicle. The bracket has a plurality of first indentations. The housing has a plurality of second indentations that mate with the first indentations. The housing is adjustably disposed with respect to the bracket along the first and second indentations. The image emitter is provided in the housing and at least partially extends from the housing. The angle between the image emitter and the bracket changing as the housing is adjusted with respect to the bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
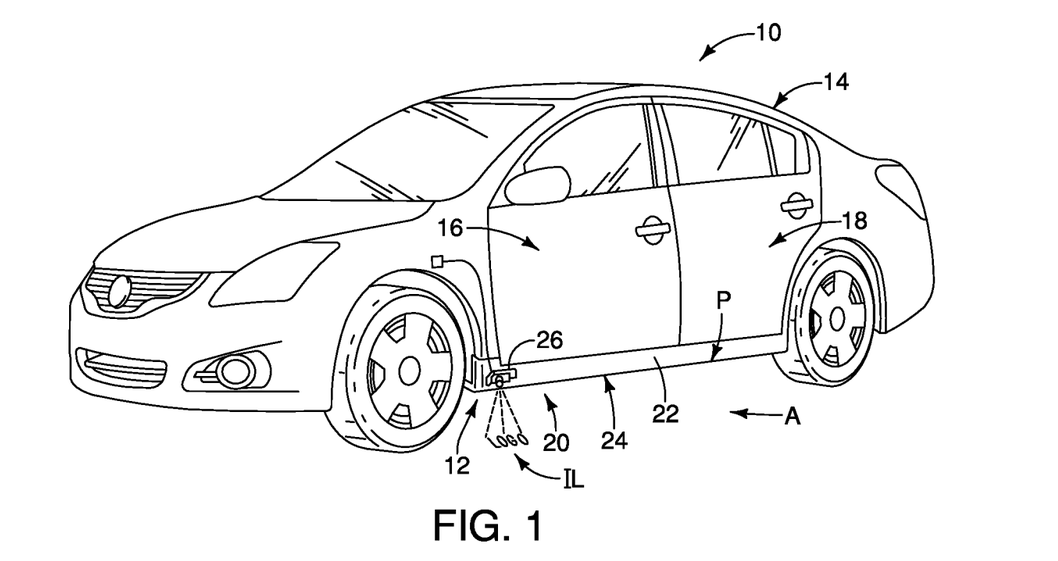
FIG. 1 is a front perspective view of a vehicle equipped with an image projector of the illustrated embodiment.
Figure 2:
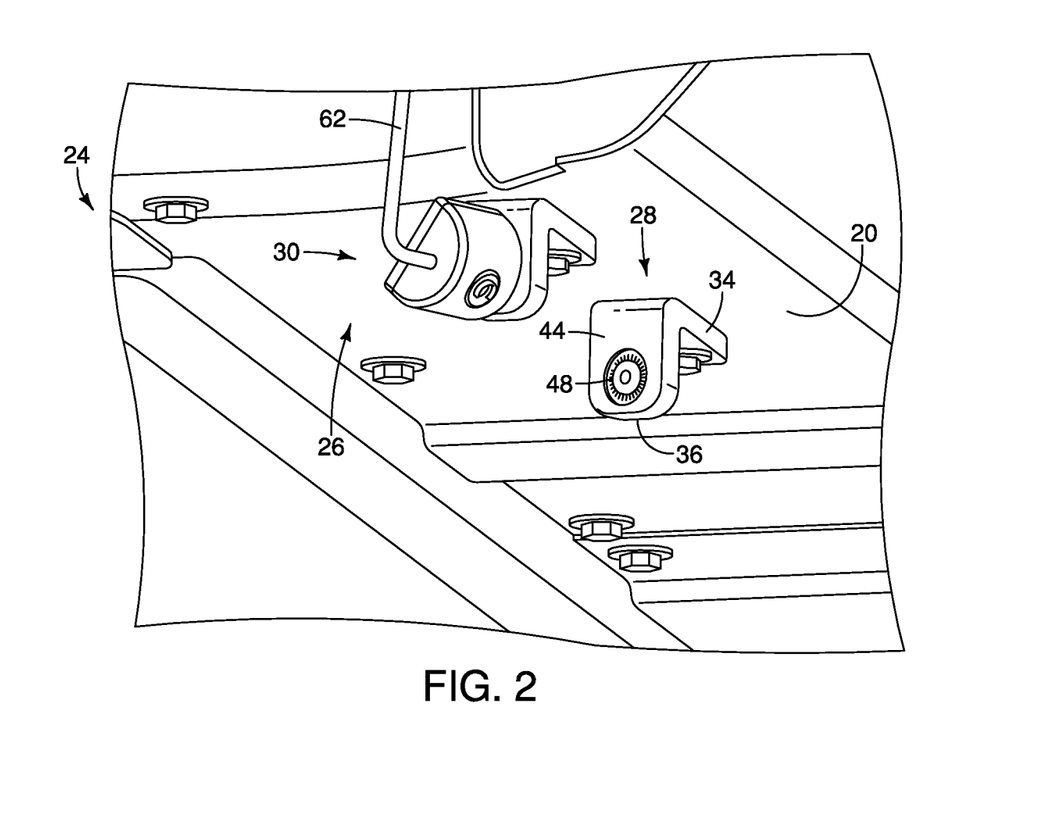
FIG. 2 is an enlarged perspective view of the image projector in FIG. 1 having a bracket and a housing.

Referring now to FIG. 1, a vehicle 10 equipped with a light system 12 is illustrated according to one embodiment of the invention. The vehicle 10 includes a vehicle body 14, a front door 16 (illustrated as driver's side), a rear door 18 (illustrated as driver's side), a rocker panel 20 and a rocker trim panel 22. In the illustrated embodiment, the rocker panel 20 and the rocker trim panel 22 are considered vehicle body components of the vehicle 10 that at least partially define an underbody 24 of the vehicle 10. The light system 12 draws electrical power for operating the image projector 26 from the electrical system for the vehicle 10. For example, the image projector 26 can be electrically connected to a welcome light control module of the vehicle 10 that powers the image projector 26 with electrical power from the vehicle's 10 electrical system.

Although the light system 12 is illustrated as being disposed on the driver's side of the vehicle 10, it will be apparent to those skilled in the vehicle field from this disclosure that the rocker panel 20 and the vehicle 10 can include an additional rocker panel (not shown) and rocker trim panel (not shown) extending along the passenger's side, which can be similarly equipped with components of the light system 12 of the illustrated embodiment.

In the illustrated embodiment, the vehicle 10 further includes an image projector 26 that is part of the light system 12. Therefore, the vehicle 10 comprises the image projector 26 that is assembled to the underbody 24 of the vehicle 10. The image projector 26 is configured to project an image onto an external area A that is exterior of the vehicle 10. In the illustrated embodiment, the image projector 26 is a logo projector that projects a logo or emblem (e.g., the projected image) of the vehicle 10. However, it will be apparent to those in the vehicle field from this disclosure that the image projector 26 can project other types of images (e.g., the date or time information) and/or messages (e.g., "welcome").

The underbody 24 defines an outer perimeter P of the vehicle 10. In the illustrated embodiment, the underbody 24 is defined by the rocker panel 20. The rocker panel 20 is a rigid panel preferably made of a durable material, such as stamped steel. In the illustrated embodiment, the image projector 26 is illustrated as being mounted to the vehicle underbody 24 in particular the rocker panel 20. However, it will be apparent from those skilled in the vehicle field from this disclosure that the underbody 24 can be defined by any other type of vehicle body panel or trim panel. Therefore, the image projector 26 can be attached or installed on various types of vehicle body panel parts that defines or is part of the vehicle underbody 24. Alternatively, it will be apparent to those skilled in the vehicle field from this disclosure that the image projector 26 can be mounted to a vehicle door or to a vehicle mirror using the techniques and components taught herein.

The image projector 26 of the illustrated embodiment can be considered an underglow image projector 26 or ground effects that is attached to the underbody 24 or beneath the chassis of the vehicle 10. The image projector 26 projects light from underbody 24 towards the illuminated area IL. The image projector 26 is oriented and/or constructed to illuminate the illuminated area IL either alone or in combination with the vehicle's 10 exterior lights (e.g., taillights or parking lights). It will be apparent to those skilled in the vehicle field from this disclosure that the image projector 26 can be implemented to illuminate the illuminated area IL by itself or in combination with other exterior lights of the vehicle 10.

Figure 3:
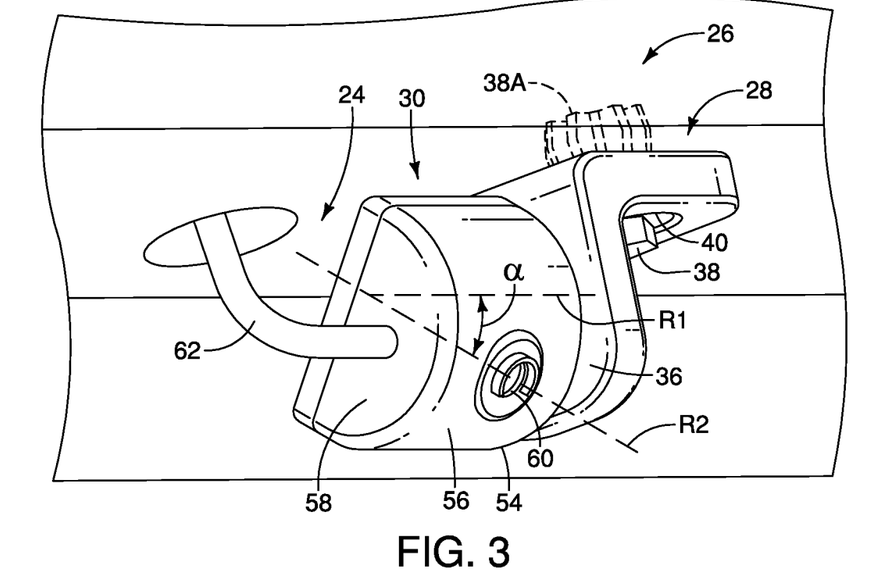
FIG. 3 is an enlarged perspective view of the image projector in FIG. 2 with the housing attached to the bracket.

Referring to FIGS. 2 to 6, the image projector 26 includes a bracket 28 and a housing 30. The image projector 26 further includes an image emitter 32 that is housed in the housing 30. The bracket 28 is fixed to the underbody 24 of the vehicle 10. The bracket 28 has a first extension 34 and a second extension 36. As best seen in FIG. 3, the first extension 34 extends parallel to a surface of the underbody 24 and defines a mounting part for the bracket 28. That is, the bracket 28 is mounted to the underbody 24 at the first extension 34. In the illustrated embodiment, the housing 30 is mounted to the bracket 28. Therefore, the housing 30 is mounted to the underbody 24 by the bracket 28. It will be apparent to those skilled in the vehicle field from this disclosure that the housing 30 can be mounted to other types of vehicle panels and/or component via the bracket 28 and the housing 30 configuration shown herein.

The bracket 28 is attached to the underbody 24 of the vehicle 10 at the first extension 34. Alternatively speaking, the bracket 28 is fixed to the vehicle body. As shown, the image projector 26 further includes a fastener 38 that fastens the bracket 28 to the vehicle body 14. The fastener 38 extends through the first extension 34 and the underbody 24. The first extension 34 includes a fastener receiving opening 40 that aligns with a corresponding receiving opening 42 of the underbody 24. As shown, the fastener 38 is a threaded fastener that is secures the bracket 28 to the underbody 24 via a nut 38A.

Figure 6:
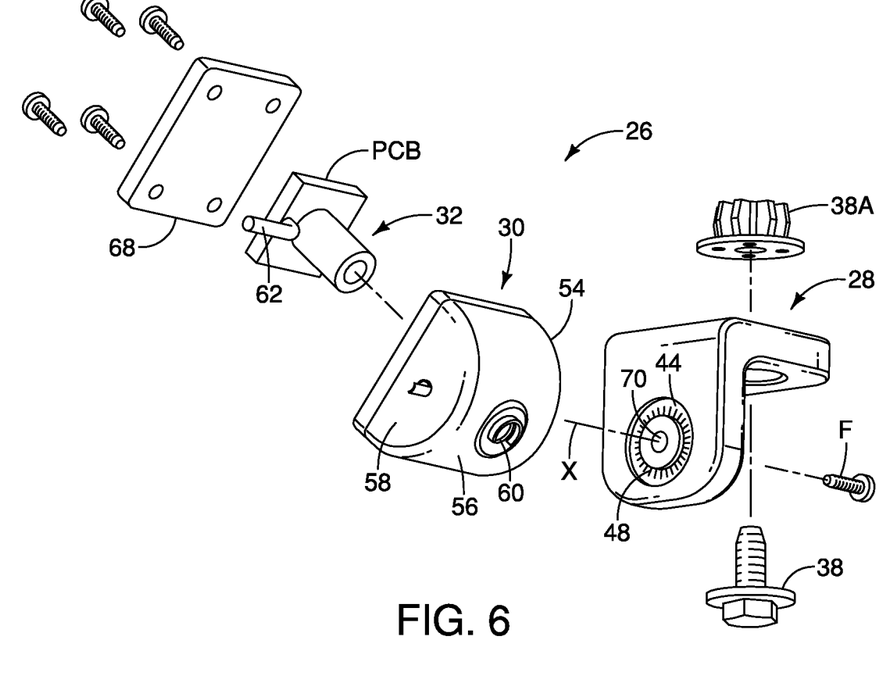
FIG. 6 is an exploded view of the image projector.

The second extension 36 extends substantially perpendicular with respect to the first extension 34. In particular, the first and second extension 36s extend cantilevered with respect to each other. The housing 30 is attached to the second extension 36 of the bracket 28. The second extension 36 includes a first mating surface 44 that mates with a second mating surface 46 of the housing 30. As shown in FIG. 6, the bracket 28 has a plurality of first indentations 48. The first indentations 48 are provided at the second extension 36. More specifically, the first indentations 48 are provided at the first mating surface 44 of the second extension 36.

Figure 7:
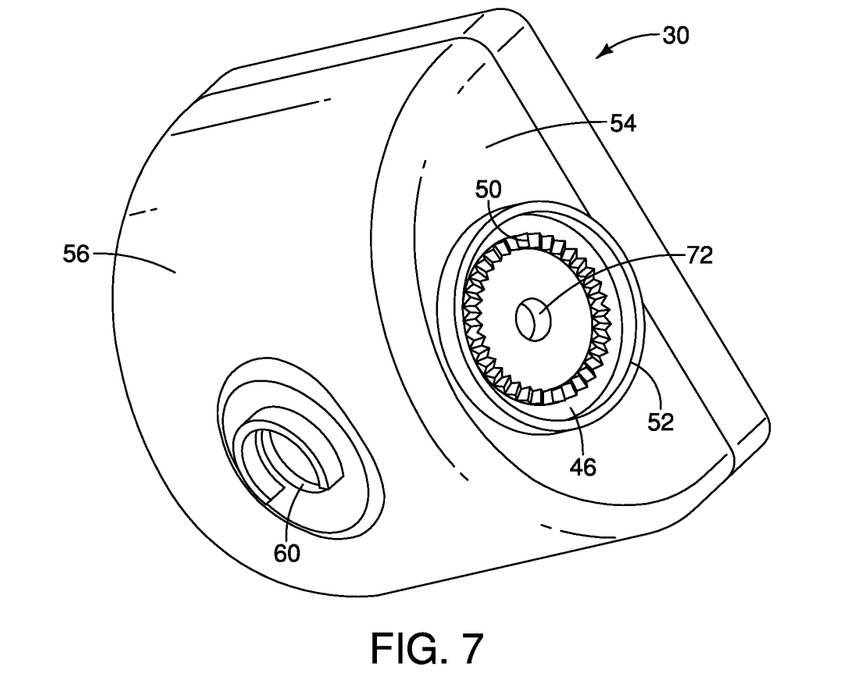
FIG. 7 is a side perspective view of the housing of the image projector.

As best seen in FIGS. 6 and 7, the first indentations 48 are annularly disposed on the second extension 36. That is, the first indentations 48 are formed in a ring or a circular shape. The first indentations 48 mate with a plurality of second indentations 50 of the housing 30, as will be further discussed. The first and second indentations 48 and 50 allow for the housing 30 to be adjustably coupled to the bracket 28 along the first and second indentations 48 and 50. The first indentations 48 can be provided like teeth or serrations along the first mating surface 44.

Referring to FIG. 7, the housing 30 has the second indentations 50 that mate with the first indentations 48. That is, the second indentations 50 are provided on the second mating surface 46 of the housing 30. The second indentations 50 are annularly disposed on the housing 30 in a circular arrangement that is similar to the first indentations 48. The first and second indentations 48 and 50 mate so to be attached to each other.

As best seen in FIG. 6, the first mating surface 44 is a recessed surface on the second extension 36. As best seen in FIG. 7, the second mating surface 46 includes an annular protrusion 52 configured to be inserted to the recessed surface of the first mating surface 44. The annular protrusion extends in the vicinity of the second indentations 50 and preferably surrounds the second indentations 50. Together, the recessed surface and the annular protrusion 52 can form a cap such that the housing 30 is capped to the bracket 28 at the first and second mating surfaces 44 and 46.

Figure 8:
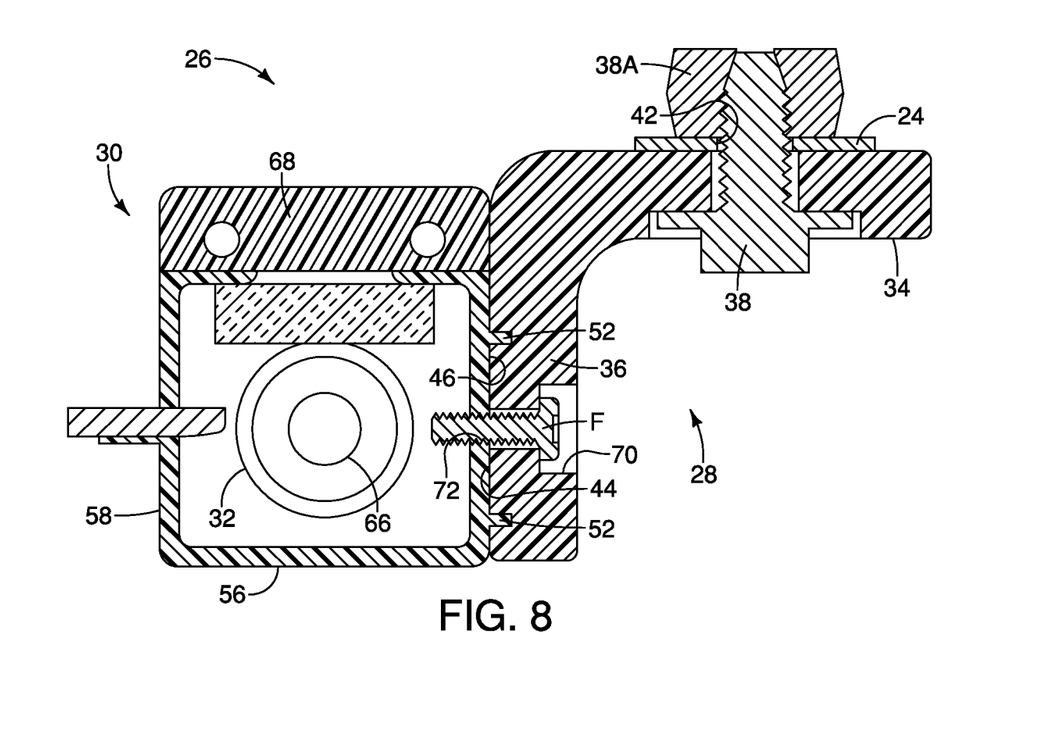
FIG. 8 is a cross-sectional view of the image projector.

The housing 30 includes a rearward facing surface 54, an exterior facing surface 56 and a forward facing surface 58. The rearward facing surface 54 includes the second mating surface 46 that mates with the bracket 28. The rearward facing surface 54 faces the bracket 28. The exterior facing surface 56 includes a projector opening 60 for the image emitter 32. The image emitter 32 projects the image through the projector opening 60. As best seen in FIGS. 6 and 8, the forward facing surface 58 faces opposite of the rearward facing surface 54. The forward facing surface 58 includes an opening for an electrical connection 62 to a power source (not shown) in the vehicle 10. Therefore, the electrical connection 62 can be a wired connection that connects the image projector 26 to the vehicle's 10 battery supply to power the image projector 26.

Figure 4:
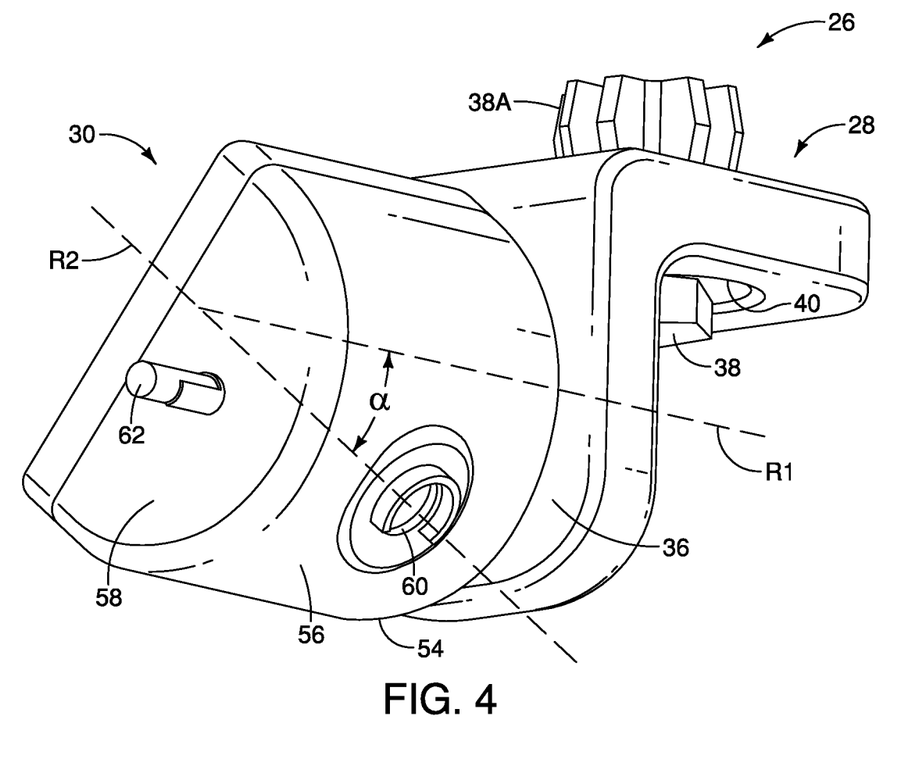
FIG. 4 is a side perspective view of the image projector.
Figure 5:
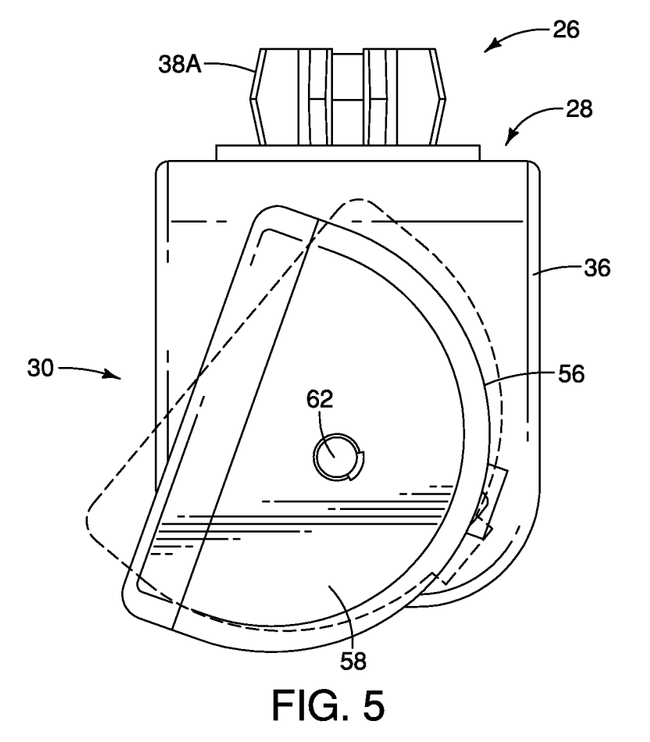
FIG. 5 is a side elevational view of the image projector.

As stated, the image emitter 32 is provided in the housing 30. As seen in FIG. 4, the image emitter 32 at least partially extends from the housing 30 so that the image is projected from the housing 30. In the illustrated embodiment, an angle α between the image emitter 32 and the bracket 28 changes as the housing 30 is adjusted with respect to the bracket 28, as will be further described below. The angle α can be considered a mounting angle α of the image emitter 32.

As best seen in FIG. 6, the image emitter 32 further includes a light source 64 and a lens stack 66. In particular, the image emitter 32 includes a printed circuit board PCB that supports the light source 64 that projects light through the lens stack 66. As seen in FIG. 6, the image emitter 32 includes a back 68 that is detachably attached to the housing 30. The back 68 is an enclosure that encases the components of the image emitter 32 inside the housing 30. The back 68 is secured to the housing by fasteners such as screws.

In the illustrated embodiment, the light source 64 is preferably an LED. The circuit board PCB mechanically supports and can electrically connects the light source 64 to an electric control module of the light system 12. The circuit board PCB can be conventional and include one or more layers of copper laminated onto a non-conductive substrate. Therefore, the circuit board PCB is preferably electrically connected to the electric control module of the light system 12 in a conventional manner. The circuit board PCB is electrically connected to the LED (i.e., the light source 64) of the image projector 26 to regulate electric current transferred from the electric control module to the light source 64 of the image projector 26. The light source 64 of the image projector 26 preferably emits at least one beam with a wavelength between 15 and 1100 nanometers of visible light.

Figure 9:
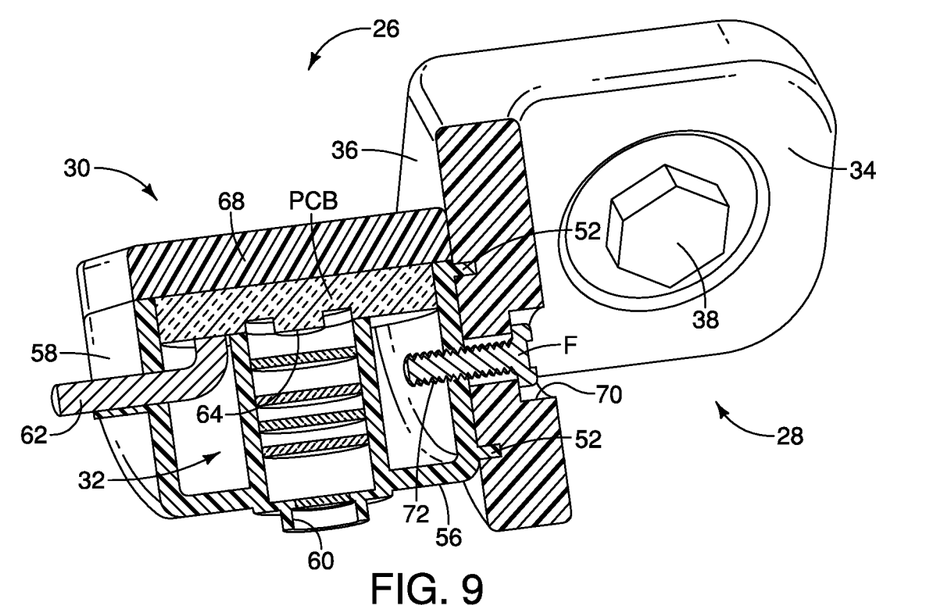
FIG. 9 is another cross-sectional view of the image projector.
Figure 10:
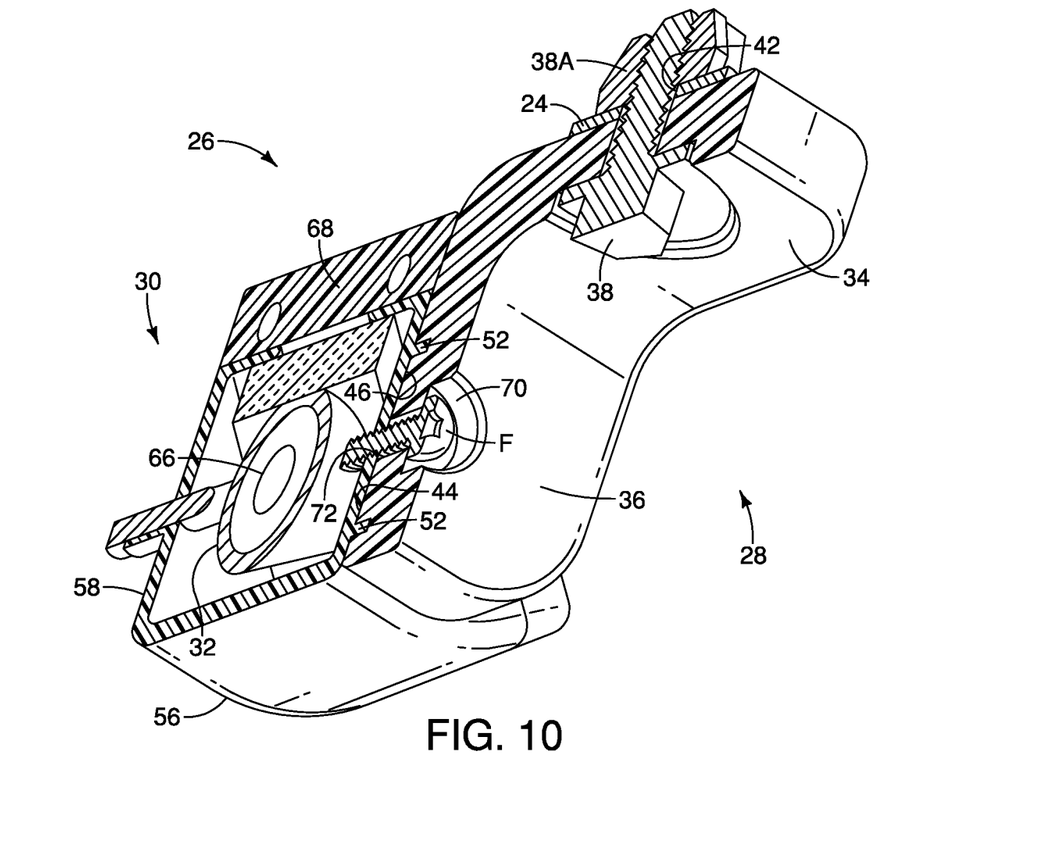
FIG. 10 is another cross-sectional view of the image projector.
Figure 11:
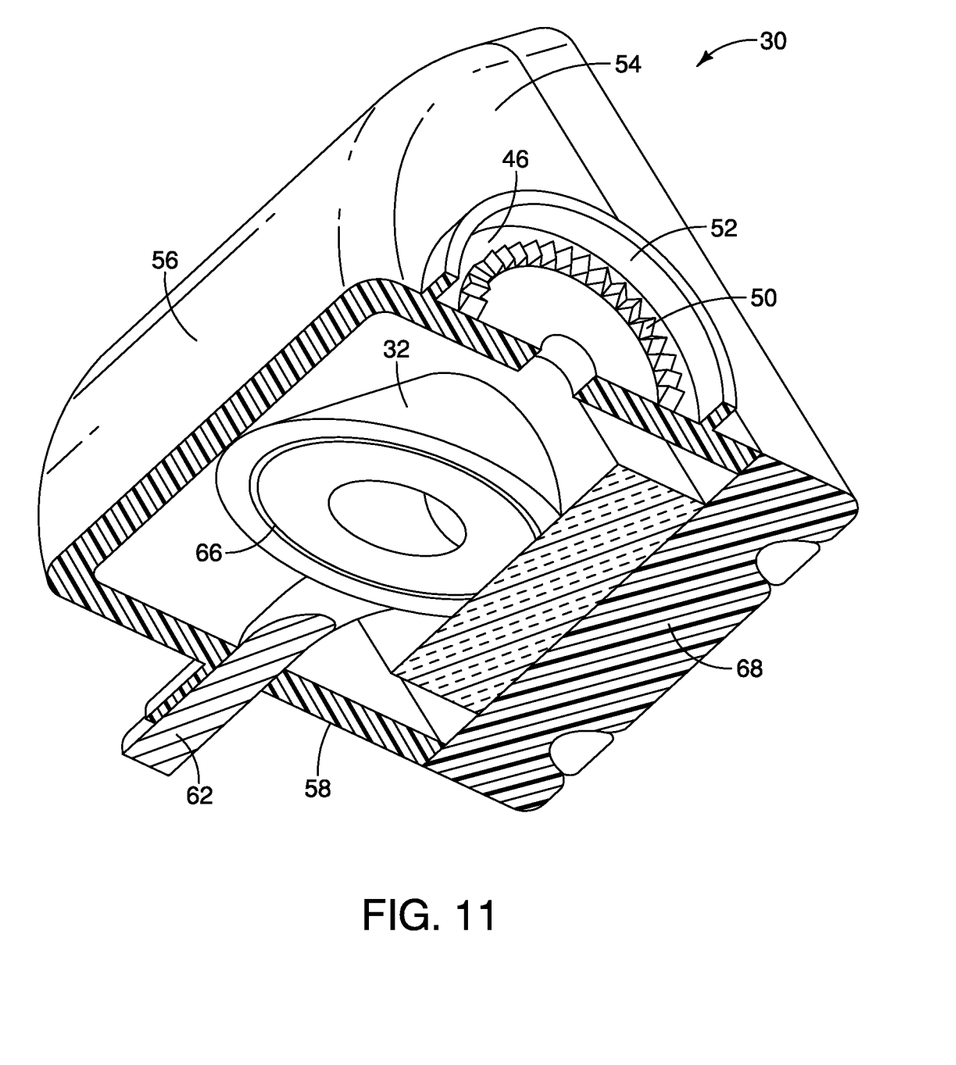
FIG. 11 is a cross-sectional view of the housing.

As seen in FIG. 9, the lens stack 66 is downstream of the light source 64. The lens stack 66 is a set of optics that are transparent plates with a nanometric surface treatment, such as etchings. The etchings provide a diffuse reflection on one side of the plates but not on the other in order to facilitate the passing of consistent light beams in a particular order. In this way, the image projector 26 generates the projected image as projected laser light. The image projector 26 preferably includes a protective lens downstream of the lens stack 66. The protective lens can include reflective material disposed at a portion of the outer surface of the lens to deflect light that would otherwise be wasted across the underbody 24. The image that is projected can be imprinted onto the surface protective lens. For example, the logo that is to be projected can be painted or imprinted onto the protective lens.

Referring to FIGS. 7 to 9 and 12, image emitter 32 further includes a fastener F that fastens the bracket 28 to the housing 30. The fastener F extends through the housing 30 and the bracket 28 to adjust the mounting angle $\alpha$ of the image emitter 32. As shown, the fastener F defines a center rotational axis X between the housing 30 and the bracket 28. The fastener F sets the angle $\alpha$ between the image emitter 32 and the bracket 28 when the fastener F is tightened to the bracket 28 and the bracket 28 and angle $\alpha$.

The second extension 36 of the bracket 28 includes a first fastener receiving opening 70 and the housing 30 includes a second fastener receiving opening 72. The first fastener receiving opening 70 and the second fastener receiving opening 72 are disposed on the mating surface and the second mating surface 46 respectively. When the first fastener receiving opening 70 and the second fastener receiving opening 72 are aligned, the fastener F extends therethrough to set a desired mounting angle $\alpha$ for the housing 30. In the illustrated embodiment, the first fastener receiving opening 70 and the second fastener receiving opening 72 are threaded openings and the fastener F is a threaded fastener such as a screw.

That is, the housing 30 can be mated to the bracket 28 as the first and second indentations 48 and 50 mate with each other. The first and second indentations 48 and 50 mate with each other at different points as the housing 30 is rotated or angle $\alpha$d with respect to the angle $\alpha$. The fastener F then sets the desired mounting angle $\alpha$ of the housing 30 with respect to the bracket 28 by tightening the fastener. With this arrangement, the image projector 26 can be used to accommodate various vehicle body types and at a variety of desired locations on the vehicle 10.

It will be apparent to those skilled in the vehicle field from this disclosure that while the first and second indentations 48 and 50 are provided as annular indentations, one of the first and second indentations 48 and 50 can be a protrusion and the other of the first and second indentations 48 and 50 can be provided in the annular arrangement such that the protrusion mates with any of the indentations annularly provided. It will also be apparent to those skilled in the vehicle field from this disclosure that any of the first and second indentations 48 and 50 can be provided as an arch or a semi-circle such that the housing 30 can be adjustably mounted to the bracket 28 at different mounting angles.

In the illustrated embodiment, the mounting angle $\alpha$ is the angle $\alpha$ between the emitting portion 35 and the bracket 28. More specifically, in the illustrated embodiment, the mounting angle $\alpha$ of the image projector 26 refers to the angle $\alpha$ formed between a reference plane R1 extending parallel with the longitudinal length first extension 34 and a line R2 bisecting the image projector 26. The line R2 defines the direction of the light beam projected by the light source 64.

The image projector 26 is made and configured for quick and easy installation to one or both sides of the vehicle as needed and/or desired. The image projector 26 can be sold as an aftermarket accessory that is subsequently installed to the vehicle at the purchaser's wishes.

The image projector 26 operates to illuminate the illuminated area IL that is the vicinity of the rocker panel 20 and the rocker trim panel 22. Therefore, the image projector 26 of the illustrated embodiment is mounted at the underbody 24 of the vehicle 10 for illuminating the illuminated area IL in the vicinity of the vehicle 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the image projector. Accordingly, these terms, as utilized to describe the present invention should be interpreted relative to a vehicle equipped with the image projector.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle comprising:
an image projector assembled to an underbody of the vehicle, the image projector having a bracket that is fixed to the underbody of the vehicle, the bracket having a plurality of first teeth,
a housing having a plurality of second teeth that mate with the first teeth, the housing being adjustably disposed with respect to the bracket along the first and second teeth, and an image emitter provided in the housing and at least partially extending from the housing, an angle between the image emitter and the bracket changing as the housing is adjusted with respect to the bracket.

2. The vehicle according to claim 1, wherein
the bracket has a first extension and a second extension, the bracket being attached to the underbody of the vehicle at the first extension, the first teeth being provided at the second extension.

3. The vehicle according to claim 2, wherein
the first teeth are annularly disposed on the second extension.

4. The vehicle according to claim 3, wherein
the second teeth are annularly disposed on the housing.

5. The vehicle according to claim 4, wherein
the image projector further including a fastener extending through the housing and the bracket.

6. The vehicle according to claim 5, wherein
the fastener defining a center rotational axis between the housing and the bracket.

7. The vehicle according to claim 6, wherein
the fastener setting the angle between the image emitter and the bracket when tightened.

8. The vehicle according to claim 7, wherein
the first extension extends parallel to a surface of the underbody, the second extension extends substantially perpendicular with respect to the first extension.

9. The vehicle according to claim 8, further comprising
another fastener extending through the first extension and the underbody.

10. An image projector assembled to an underbody of the vehicle, the image projector having
a bracket configured to be fixed to the underbody of the vehicle, the bracket having a plurality of first teeth,
a housing having a plurality of second teeth that mate with the first teeth, the housing being adjustably disposed with respect to the bracket along the first and second teeth, and
an image emitter provided in the housing and at least partially extending from the housing, an angle between the image emitter and the bracket changing as the housing is adjusted with respect to the bracket.

11. The image projector according to claim 10, wherein
the bracket has a first extension and a second extension, the bracket having an attachment surface to be attached to the underbody of the vehicle at the first extension, the first teeth being provided at the second extension.

12. The image projector according to claim 11, wherein
the first teeth are annularly disposed on the second extension.

13. The image projector according to claim 12, wherein
the second teeth are annularly disposed on the housing.

14. The image projector according to claim 13, wherein
the image projector further including a fastener extending through the housing and the bracket.

15. The image projector according to claim 14, wherein
the fastener defining a center rotational axis between the housing and the bracket.

16. The image projector according to claim 15, wherein
the fastener setting the angle between the image emitter and the bracket when tightened.

17. The image projector according to claim 16, wherein
the first extension extends parallel to a surface of the underbody, the second extension extends substantially perpendicular with respect to the first extension.

18. The image projector according to claim 17, further comprising
another fastener extending through the first extension to attach the first extension to the underbody.

* * * * *